United States Patent
Chan et al.

(10) Patent No.: US 8,656,200 B2
(45) Date of Patent: *Feb. 18, 2014

(54) SYSTEM FOR REDUCING POWER CONSUMPTION IN AN ELECTRONIC CHIP

(75) Inventors: Kum Cheong Adam Chan, Singapore (SG); Chi Hock Goh, Singapore (SG); Poh Boon Teo, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/340,311

(22) Filed: Dec. 29, 2011

(65) Prior Publication Data

US 2012/0096296 A1    Apr. 19, 2012

Related U.S. Application Data

(62) Division of application No. 12/250,829, filed on Oct. 14, 2008, now Pat. No. 8,095,815.

(51) Int. Cl.
*G06F 1/30* (2006.01)
*G06F 1/32* (2006.01)

(52) U.S. Cl.
USPC ........... 713/323; 713/310; 713/322; 713/324; 370/318

(58) Field of Classification Search
USPC ............................ 713/310, 322–324; 370/318
See application file for complete search history.

(56) References Cited

U.S. PATENT DOCUMENTS

| | | | |
|---|---|---|---|
| 5,404,544 A | 4/1995 | Crayford | |
| 6,308,278 B1 * | 10/2001 | Khouli et al. | 713/323 |
| 6,366,143 B1 * | 4/2002 | Liu et al. | 327/142 |
| 6,546,496 B1 | 4/2003 | Wang et al. | |
| 6,961,859 B2 | 11/2005 | Derocher et al. | |
| 7,027,437 B1 | 4/2006 | Merchant | |
| 7,711,970 B2 | 5/2010 | Keller | |
| 7,865,748 B2 | 1/2011 | Lee et al. | |
| 8,340,111 B1 * | 12/2012 | Krivitski et al. | 370/419 |
| 2003/0226050 A1 | 12/2003 | Yik et al. | |
| 2005/0268122 A1 | 12/2005 | Young et al. | |
| 2007/0025349 A1 | 2/2007 | Bajic | |
| 2007/0130280 A1 | 6/2007 | Park et al. | |
| 2007/0280239 A1 | 12/2007 | Lund | |

* cited by examiner

*Primary Examiner* — Thuan Du

(57) ABSTRACT

A system for reducing power consumption in an electronic device comprising at least one electronic chip comprises a plurality of local access network (LAN) ports, a transceiver coupled between the LAN ports and the electronic chip, a PLA device, and a central processing unit (CPU). The CPU is configured to power off the electronic chip in response to a period of inactivity on the LAN ports and power on the electronic chip in response to a signal from the PLA device.

17 Claims, 3 Drawing Sheets

SYSTEM FOR REDUCING POWER CONSUMPTION IN AN ELECTRONIC CHIP

CLAIM FOR PRIORITY

This application is a divisional application of U.S. patent application Ser. No. 12/250,829, filed on Oct. 14, 2008, now U.S. Pat. No. 8,095,815 which is hereby incorporated by reference in its entirety.

BACKGROUND

Due to environmental consciousness and high energy costs, reducing power consumption in communication systems has become more and more important. One of the major sources of power consumption in communication systems is a network switch. For instance, in high-capacity network switches used in office networks and datacenters, network switches have often been significant sources of power consumption and heat generation in maintaining high bandwidth access channels for all users. According to a conventional method of reducing power consumption in network equipment, a programmable power supply has been used to power off a group of office equipment including a network switch during nights and weekends. However, such a method results in causing inconvenience to occasional users of the networks during a period that the network equipment is powered off. Accordingly, there is a need for a system for reducing power consumption in network equipment during a period of network inactivity while conveniently allowing access to the network for occasional network users during the period of inactivity.

BRIEF DESCRIPTION OF DRAWINGS

The embodiments of the invention will be described in detail in the following description with reference to the following figures.

DETAILED DESCRIPTION OF EMBODIMENTS

Figure 1:
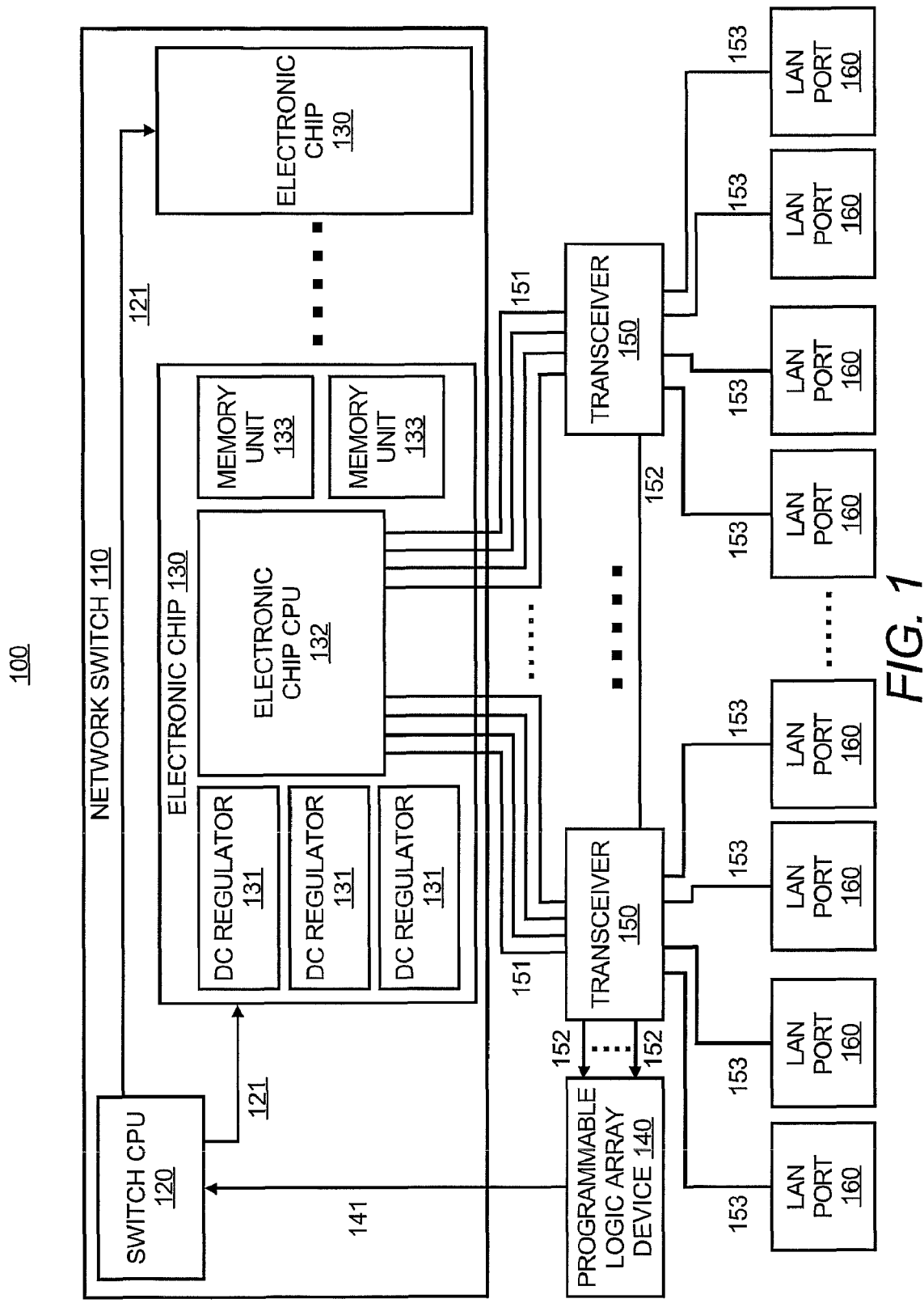
FIG. 1 illustrates a system for reducing power consumption in a network switch according to an exemplary embodiment of the invention.

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

According to an example, a system for reducing power consumption in a network switch completely powers down an entire media access control (MAC) chip in response to a period of inactivity on local area network (LAN) ports assigned to a transceiver of the network switch and powers on the MAC chip in response to a detection, by a transceiver connected to the LAN ports, of a port signal present on one of the LAN ports. The MAC chip comprises a MAC central processing unit (CPU), direct current (DC) voltage regulators, and memory units. While the MAC chip is powered down in response to a period of inactivity on the LAN ports assigned to the transceiver of the MAC chip, the transceiver is powered on to detect a port signal present on one of the LAN ports and generate a detection signal in response to the detection. According to an example, the detection signal controls a programmable logic array (PLA) device coupled to the transceiver to generate a PLA signal. The PLA signal is used by a central processing unit (CPU) of the network switch to power on and power off the MAC chip. In addition to controlling the PLA, the detection signal from the transceiver may also control powering on and powering off of a light emitting diode (LED) of the transceiver to indicate a status of activities on the LAN ports.

By completely powering off an entire MAC chip during a period of inactivity on LAN ports assigned to the transceiver of the MAC chip, a considerable reduction in power consumption may be achieved in network switches. For instance, conventional 10 megabit, 100 megabit, and 1 gigabit Ethernet ports each require about 2.5 watts (W) of power during a normal operation. Since about 1.7 W out of the normal 2.5 W power consumption required for each port is attributable to the MAC chip(s) of a network switch, by powering off the MAC chip during a period of inactivity on the LAN ports, a reduction of more than 50% in power consumption in network switches in performing operations related to the MAC chip and associated LAN ports may be obtained. Further, since a MAC chip may support 12 to 24 ports and most 48-port Ethernet chassis have at least two MAC chips, the reduction in power consumption by powering off MAC chips of network switches during a period of inactivity on LAN ports assigned to the transceivers of the MAC chips may be significant.

By powering off a MAC chip instead of the entire network switch including the MAC chip in response to a period of inactivity on LAN ports assigned to the transceiver of the network switch, a user of the network after a power-down of the MAC chip may need to wait only a short amount of time for powering on the MAC chip (for instance, less than a minute) rather than for the longer period of time expected with powering on of the entire network switch (for instance, 3-5 minutes).

Turning first to FIG. 1, shown therein is a system 100 for reducing power consumption in a network switch 100, according to an example. The system 100 comprises the network switch 110, one or more transceivers 150, each of which are coupled to respective LAN ports 160, and a PLA device 140. It should be understood that the system 100 may include additional components and that some of the components described herein may be removed and/or modified without departing from a scope of the system 100. While the system 100 will be explained below in connection with reducing power consumption for the network switch 110, the same description and power-reduction features may be applied to other network equipment.

In explaining each component of the system 100 more specifically, the network switch 110 may be any reasonably suitable switch for routing data to and from appropriate LAN ports 160 such as a LAN switch, other network switch, etc. The network switch 110 comprises a switch CPU 120 and one or more electronic chips 130.

The switch CPU 120 may be any reasonably suitable CPU for controlling operations of the network switch 110 such as powering on or powering down of the electronic chips 130 and selectively choosing an electronic chip for communicating data of the network switch 110 with appropriate LAN ports 160. The switch CPU 120 produces a power-on control signal 121 to control the power-on or power-off operation of the one or more electronic chips 130.

Each electronic chip 130 may be any reasonably suitable structure for performing operations of the network switch 110 in response to instructions from the switch CPU 120, such as a MAC chip, for accessing the transceivers 150 to receive and/or transmit data, other network switch chip, etc. Each electronic chip 130 comprises one or more DC regulators 131, an electronic chip CPU 132, and one or more memory units 133. Components of each electronic chip 130 may together form a unitary structure on a single substrate or a divided structure over multiple substrates depending upon different design needs of the system 100. Each DC regulator 131 may be any reasonably suitable device for supplying a DC voltage to the electronic chip CPU 132. The electronic chip CPU 132 may be any reasonably suitable device for performing operations and processing data for the electronic chip 130, such as a MAC CPU, other network chip CPU, etc. Each memory unit 133 may be any reasonably suitable device for storing data for use by the electronic chip CPU 132 such as a random access memory (RAM), a read only memory (ROM), etc.

With respect to the one or more transceivers 150 coupled to the electronic chip CPU 132 of a corresponding electronic chip CPU 132, each transceiver 150 may be any reasonably suitable device for receiving or transmitting data to or from LAN devices (not shown) connected through the corresponding LAN ports 160 such as a physical layer device of an Ethernet. Each transceiver 150 is connected to the corresponding electronic chip 130 through a communication channel 151 and to corresponding LAN ports 160 via a communication channel 153. The communication channel 151 may be formed of a separate channel for communicating data for each corresponding LAN port 160 connected to the transceiver 150 or a common channel for all of the LAN ports 160 connected to the transceiver 150. The communication channel 153 may be formed of a separate channel 153 for communicating data for each corresponding LAN port 160 connected to the transceiver 150.

If a port signal is present on one of the LAN ports 160, the transceiver 150 having the LAN port 160 assigned to the transceiver 150 detects the port signal and generates a detection signal 152. The port signal may be any reasonable port signal such as a data signal, ping signal, etc. The PLA device 140 receives one or more detection signals 152 from the one or more transceivers 150 and generates a PLA signal 141. The PLA device 140 may be any reasonably suitable programmable device used to implement a combinational logic circuit such as a complex programmable logic device (CPLD). As to constituents of the PLA device 140, the PLA device 140 may comprise a set of programmable AND gate planes, which link to a set of programmable OR gate planes, which may then be conditionally complemented to produce an output.

In being used within the system 100, the PLA device 140 generates the PLA signal 141 in response to a detection signal 152 from a transceiver 150 so that the switch CPU 120 may control the powering on and powering off of the one or more electronic chips 130 based on the PLA signal 141. If there are multiple electronic chips 130 in the switch 110, the PLA signal 141 may indicate which of the one or more transceivers 150 generated a detection signal to cause the generation of the PLA signal 141. With the identity information of the transceiver 150 causing the generation of the PLA signal 141, the switch CPU 120 may selectively power up an electronic chip 130 having the transceiver 150 as an assigned transceiver.

Alternatively, the PLA device 140 may determine a power-control of each electronic chip 130, and the PLA signal 141 may comprise an identification of an electronic chip 130 and an instruction to the switch CPU 120 to control one or more electronic chips 130 to power up, power down, etc.

In explaining the operations of the power-up and/or power-down of the electronic chips 130 in the network switch 110, the switch CPU 120 may selectively power down an entire electronic chip 130 in response to a period of inactivity on the LAN ports 160 assigned to the transceivers 150 of the electronic chip 130. The period of inactivity on the LAN ports 160 may be measured as an amount of time elapsed since outputting of a last PLA signal 141 for the electronic chip 130 and/or detection of a last port signal 152 from the LAN ports 160 assigned to the transceivers 150 of the electronic chip 130. If the amount of time falls below a predetermined amount of time, the electronic chip 130 may be powered on. However, if the amount of time exceeds the predetermined amount of time, the electronic chip 130 may be powered off. While the electronic chip 130 is powered down, the transceivers 150 assigned to the electronic chip 130 are powered on to detect any port signal present on the LAN ports 160 assigned to the transceivers 150 and generate a detection signal 152 in response to the detection.

In the meantime, if there are other electronic chips 130 in addition to the electronic chip 130 being powered down, the other electronic chips 130 may remain powered on to perform operations of the network switch 110, unless the LAN ports 160 assigned to the transceivers 150 of the additional electronic chips 130 are also powered down in response to a period of inactivity on the LAN ports 160 of the transceivers 150 of the other electronic chips 130. The period of inactivity for triggering a power-down of an electronic chip 130 may be any reasonably suitable period, such as an hour, a day, etc. In addition to the above-described power-down of an electronic chip 130 in response to a period of inactivity on the LAN ports 160 of the transceivers 150 of the electronic chip 130, the electronic chip 130 may also be powered down at a certain time of a day by previously scheduling a power-down operation, for example, at 1 am, when network accesses through the LAN ports 160 of the transceivers 150 assigned to the electronic chip 130 are expected to be infrequent.

After the power-down of an electronic chip 130, if a port signal is present on one of the LAN ports 160 assigned to a transceiver 150 of the electronic chip 130, the detection signal 152 is produced by the assigned transceiver 150 in response to the detection. The detection signal 152 is used by the PLA device 140 to generate the PLA signal 141 and thus notifies the switch CPU 120 of the activity occurrence. The switch CPU 120 generates and communicates a power-on control signal 121 to the electronic chip 130 to power on the electronic chip 130 in response to the detection of the activity at one of the LAN ports 160 assigned to the transceivers 150 of the electronic chip 130.

Figure 2:
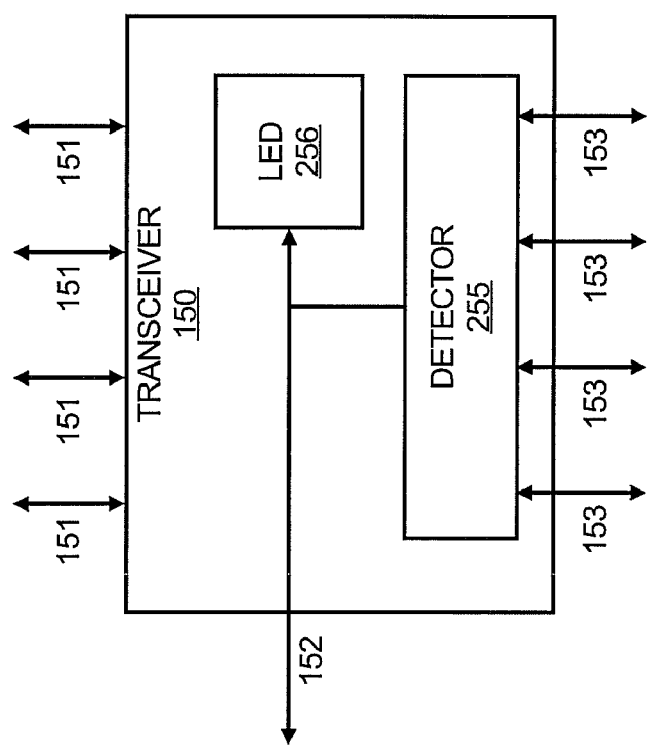
FIG. 2 illustrates a transceiver having an LED and a detector according to an exemplary embodiment of the invention.

Now turning to FIG. 2, shown therein is the transceiver 150 having an LED 256 and a detector 255, according to an example. The detector 255 is coupled to the LAN ports 160 of the transceiver 150 through respective communication channels 153 and detects port signals at the LAN ports 160. The detection signal 152 may be generated each time a port signal is detected on a port 160. Alternatively, the detection signal 152 may be generated periodically at each periodic interval that one or more port signals are detected at the ports 160, or in any other reasonably suitable way as reasonably necessary to meet the design needs of the system 100. Further, the detection signal 152 may be any reasonably suitable signal to indicate a detection of a port signal, such as an optical signal, which may be detected by using an optical sensor at, for example, the PLA device 140, electrical signal, etc.

The LED 256 may receive the detection signal 152 and may be powered on or off in accordance with the detection signal 152 to indicate a presence of a port signal at the LAN ports 160 of the transceiver 150. While the LED 256 is particularly discussed, the LED 256 may be obviated altogether, or one or more other reasonably suitable light emitting devices may also be used in place of the LED 256. Further, the LED 256 may be replaced by one or more LEDs outside the transceiver 150 such as LEDs forming a unit by themselves, LEDs forming a part of another device, etc. By using the same detection signal 152 that powers on the electronic chip 130 assigned to the transceiver 150 after detecting a port signal at one of the LAN ports 160 to also drive the LED 256, additional circuitry to generate a detection signal for controlling the LED 256 separate from the detection signal 152 for being provided to the PLA array 140 may be obviated.

Figure 3:
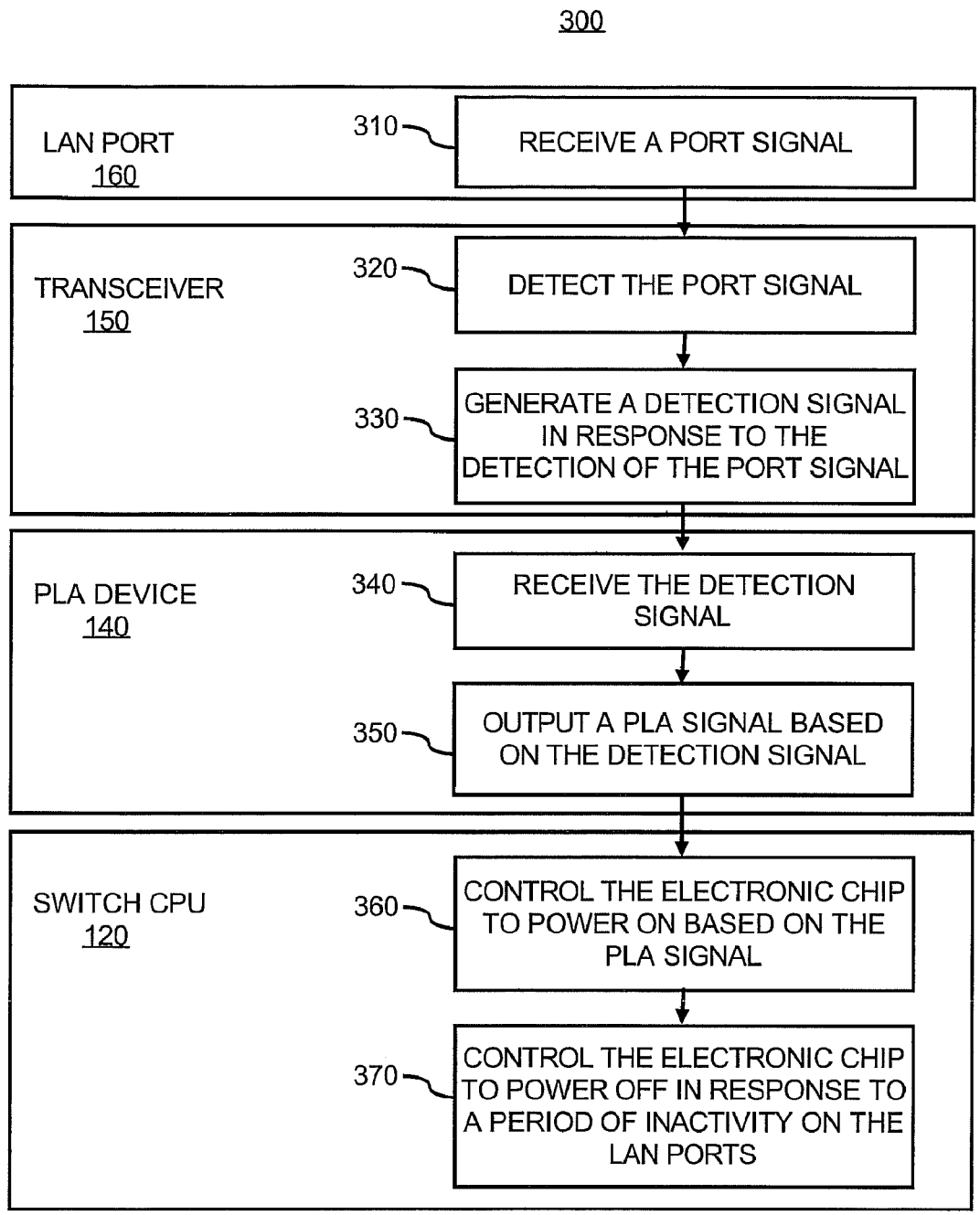
FIG. 3 illustrates a flowchart of a method for reducing power consumption in an electronic chip according to an exemplary embodiment of the invention.

Turning now to FIG. 3, shown therein is a flowchart of a method 300 for reducing power consumption in an electronic chip 130, according to an example. It should be apparent to those of ordinary skill in the art that other steps may be added or existing steps may be removed, modified or rearranged without departing from a scope of the method 300.

In one of a plurality of LAN ports 160 assigned to a transceiver 150, a port signal is received at step 310.

In the transceiver 150, the port signal is detected at step 320, and a detection signal 152 is generated in response to the detection of the port signal at step 330.

In the PLA device 140, the detection signal 152 is received at step 340, and a PLA signal 141 based on the detection signal 152 is outputted at step 350.

In the switch CPU 120, the electronic chip 130 is controlled to power on based on the PLA signal 141 at step 360, and the electronic chip 130 is controlled to power off in response to a period of inactivity on the LAN ports 160 at step 370.

In connection with the method 300, in the switch CPU 120, the period of inactivity on the LAN ports 160 is determined based upon an amount of time elapsed since outputting of a last PLA signal. The electronic chip 130 may be powered on based on the amount of elapsed time falling below a predetermined time amount, and the electronic chip may be powered off in response to the amount of elapsed time exceeding the predetermined amount of time. Further, the transceiver 150 may have a light emitting diode 256 controlled by the detection signal 152.

Any one or more of the above-described operations of the system 100 and the transceiver 150 in reference to exemplary features and embodiments of FIGS. 1-3 may be contained as a computer program product embodied on one or more tangible computer readable storage mediums unless clearly contradictory. The computer program product may exist in a variety of forms both active and inactive. For instance, the computer program product may exist as software program(s) comprised of program instructions in source code, object code, executable code or other formats whether compressed or uncompressed. Exemplary tangible computer readable storage mediums include conventional computer system RAM, ROM, EPROM, EEPROM, and magnetic or optical disks or tapes.

Any one or all of the exemplary features and embodiments of the invention may be applied and is incorporated in any and all of the embodiments of the invention unless clearly contradictory.

While the embodiments have been described with reference to examples, those skilled in the art will be able to make various modifications to the described embodiments without departing from the scope of the claimed embodiments.

What is claimed is:

1. A system for reducing power consumption in an electronic device comprising at least one electronic chip, the system comprising:
    a plurality of local access network (LAN) ports to connect to LAN devices;
    a transceiver coupled between the LAN ports and the electronic chip, to receive and transmit data through the LAN ports, detect a port signal present on one of the LAN ports, and generate a detection signal based on the detection;
    a logic device to receive the detection signal and output a logic signal based on the detection signal; and
    a power control logic to power off the electronic chip in response to a period of inactivity on the LAN ports and power on the electronic chip in response to the logic signal.

2. The system of claim 1, wherein the transceiver has a light emitting diode controlled by the detection signal.

3. The system of claim 1, wherein the electronic device comprises a plurality of electronic chips, and the system further comprises, for each of the plurality of electronic chips:
    a plurality of LAN ports; and
    a transceiver coupled between the LAN ports and the electronic chip, to receive and transmit data through the LAN ports, detect a port signal present on one of the LAN ports, and generate a detection signal based on the detection,
    wherein the logic device is to receive the detection signals from the transceivers, and
    wherein the power control logic is to power off one of the plurality of electronic chips in response to a period of inactivity on the corresponding LAN ports of the respective electronic chip.

4. The system of claim 1, wherein the transceiver is powered on when the electronic chip is powered off by the power control logic in response to a period of inactivity on the LAN ports.

5. The system of claim 1, wherein the port signal comprises a ping signal.

6. The system of claim 1, wherein the power control logic is to power off the electronic chip at a certain time of a day by previously scheduling the power-off operation.

7. The system of claim 1, wherein the electronic chip comprises an electronic chip central processing unit (CPU), a direct current (DC) regulator to provide a DC voltage to the electronic chip CPU, and a memory unit to store data for operations of the electronic chip CPU.

8. The system of claim 1, wherein the detection signal is an optical signal and the logic device comprises an optical sensor for detecting the optical signal.

9. The system of claim 1, wherein, to power off the electronic chip in response to a period of inactivity on the LAN ports, the power control logic is to:
    determine whether an amount of time elapsed since a last detection signal from the transceiver is greater than a predetermined amount of time; and
    power off the electronic chip in response to a determination that the amount of elapsed time is greater than the predetermined amount of time.

10. An apparatus for reducing power consumption in an electronic chip comprising:
    a transceiver coupled between a plurality of local access network (LAN) ports and the electronic chip, wherein the transceiver is to receive and transmit data through the LAN ports, detect a port signal present on one of the LAN ports, and generate a detection signal based on the detection;

a logic device to receive the detection signal and output a logic signal based on the detection signal; and a power control logic to power off the electronic chip in response to a period of inactivity on the LAN ports and power on the electronic chip in response to the logic signal.

11. The apparatus of claim 10, wherein the transceiver has a light emitting diode controlled by the detection signal.

12. The apparatus of claim 10, wherein the transceiver is configured to be powered on when the electronic chip is powered off by the power control logic in response to a period of inactivity on the LAN ports.

13. The apparatus of claim 10, wherein the detection signal is an optical signal and the logic device comprises an optical sensor for detecting the optical signal.

14. The apparatus of claim 10, wherein, to power off the electronic chip in response to a period of inactivity on the LAN ports, the power control logic is to:

determine whether an amount of time elapsed since a last detection signal from the transceiver is greater than a predetermined amount of time; and power off the electronic chip in response to a determination that the amount of elapsed time is greater than the predetermined amount of time.

15. A method for reducing power consumption in an electronic chip, the method comprising:

in one of a plurality of local access network (LAN) ports, receiving a port signal;

in a transceiver, detecting the port signal; and generating a detection signal in response to the detection of the port signal;

in a logic device, receiving the detection signal; and outputting a logic signal based on the detection signal; and in a power control logic, powering on the electronic chip based on the logic signal; and powering off the electronic chip in response to a period of inactivity on the LAN ports, including determining whether an amount of time elapsed since a last detection signal from the transceiver is greater than a predetermined amount of time; and powering off the electronic chip in response to a determination that the amount of elapsed time is greater than the predetermined amount of time.

16. The method of claim 15, further comprising:

wherein powering on the electronic chip comprises powering on the electronic chip based on a determination that the amount of elapsed time is less than the predetermined amount of time.

17. The method of claim 15, wherein the transceiver has a light emitting diode (LED) controlled by the detection signal and wherein receiving the detection signal further comprises receiving the detection signal by optically reading activity on the LED.

* * * * *